(12) United States Patent
Chen

(10) Patent No.: US 6,428,192 B1
(45) Date of Patent: Aug. 6, 2002

(54) ADJUSTABLE FRONT LAMP FOR A BICYCLE

(76) Inventor: Pao-Liang Chen, No. 26, Alley 26, Lane 57, Cheng-Kung Rd., Ta-Li City, Taichung Hsien (TW)

( * ) Notice: Subject to any disclaimer, the term of this patent is extended or adjusted under 35 U.S.C. 154(b) by 0 days.

(21) Appl. No.: 09/817,452

(22) Filed: Mar. 26, 2001

(51) Int. Cl.[7] .................................................. B62J 6/00
(52) U.S. Cl. ........................ 362/474; 362/475; 362/476; 362/191; 74/551.8; 403/391; 403/398
(58) Field of Search ................................ 362/474, 475, 362/476, 191, 396; 74/551.1, 551.8; 403/385, 391, 398

(56) References Cited

U.S. PATENT DOCUMENTS

| | | | | |
|---|---|---|---|---|
| 4,711,107 A | * | 12/1987 | Drane | ........................... 70/233 |
| 5,562,013 A | * | 10/1996 | Kao | ............................ 74/551.3 |
| 5,921,669 A | * | 7/1999 | Taylor et al. | ................ 362/476 |
| 6,343,891 B1 | * | 2/2000 | Combs | ........................ 402/391 |
| 6,192,773 B1 | * | 2/2001 | Liao | ............................ 74/551.3 |

\* cited by examiner

Primary Examiner—Sandra O'Shea
Assistant Examiner—Ronald E. Delgizzi
(74) Attorney, Agent, or Firm—Thorp Reed & Armstrong LLP

(57) ABSTRACT

An adjustable front lamp assembled between a tube and a handlebar of a bicycle. The lamp has a stem having a chamber defined therein, and a battery seat received in the chamber. A cover is provided on a top of the stem and has a bar laterally formed on an inner face of a front end thereof. A lamp seat is movably assembled on the front end of the stem. The lamp seat includes an upper housing and a lower housing, and has a lamp switch provided therein and electrically connected with the battery seat. The upper housing has a tongue extending between the cover and the stem, and a lamp button provided at a top face thereof and engaged with the lamp switch. An illuminating member is assembled in the lamp seat and electrically connected with the lamp switch.

10 Claims, 6 Drawing Sheets

ADJUSTABLE FRONT LAMP FOR A BICYCLE

BACKGROUND OF THE INVENTION

1. Field of the Invention

The present invention is related to an attachment for a bicycle, and more particularly to a front lamp for the bicycle.

2. Description of Related Art

Referring to FIG. 6, a bicycle usually has a front lamp (64) assembled on a handlebar (62) thereof. The handlebar is connected with a head tube (60) by a stem (61) and has a pair of grips (63) respectively provided at two distal ends thereof. The front lamp (64) is fastened on the handlebar (62) by a C-like clamp (65). When a user wants to change an angle of the front lamp (64) to the handlebar (62), he or she must adjust it before starting to ride as it is difficult and dangerous for the user to adjust the lamp (64) during riding. Furthermore, after adjusting the clamp (65) many times, it will lose flexibility and cannot fasten the front lamp (64) tightly. Thus, the front lamp (64) cannot be held at a desired angle whereby the road ahead is not properly illuminated and thus the rider is exposed to danger. Therefore, the invention provides an adjustable front lamp to mitigate and/or obviate the aforementioned problems.

SUMMARY OF THE INVENTION

The main objective of the present invention is to provide a front lamp for a bicycle which is able to be safely adjusted by a user while riding the bicycle. Other objects, advantages and novel features of the invention will become more apparent from the following detailed description when taken in conjunction with the accompanying drawings.

DETAILED DESCRIPTION OF THE PREFERRED EMBODIMENT

Figure 1:
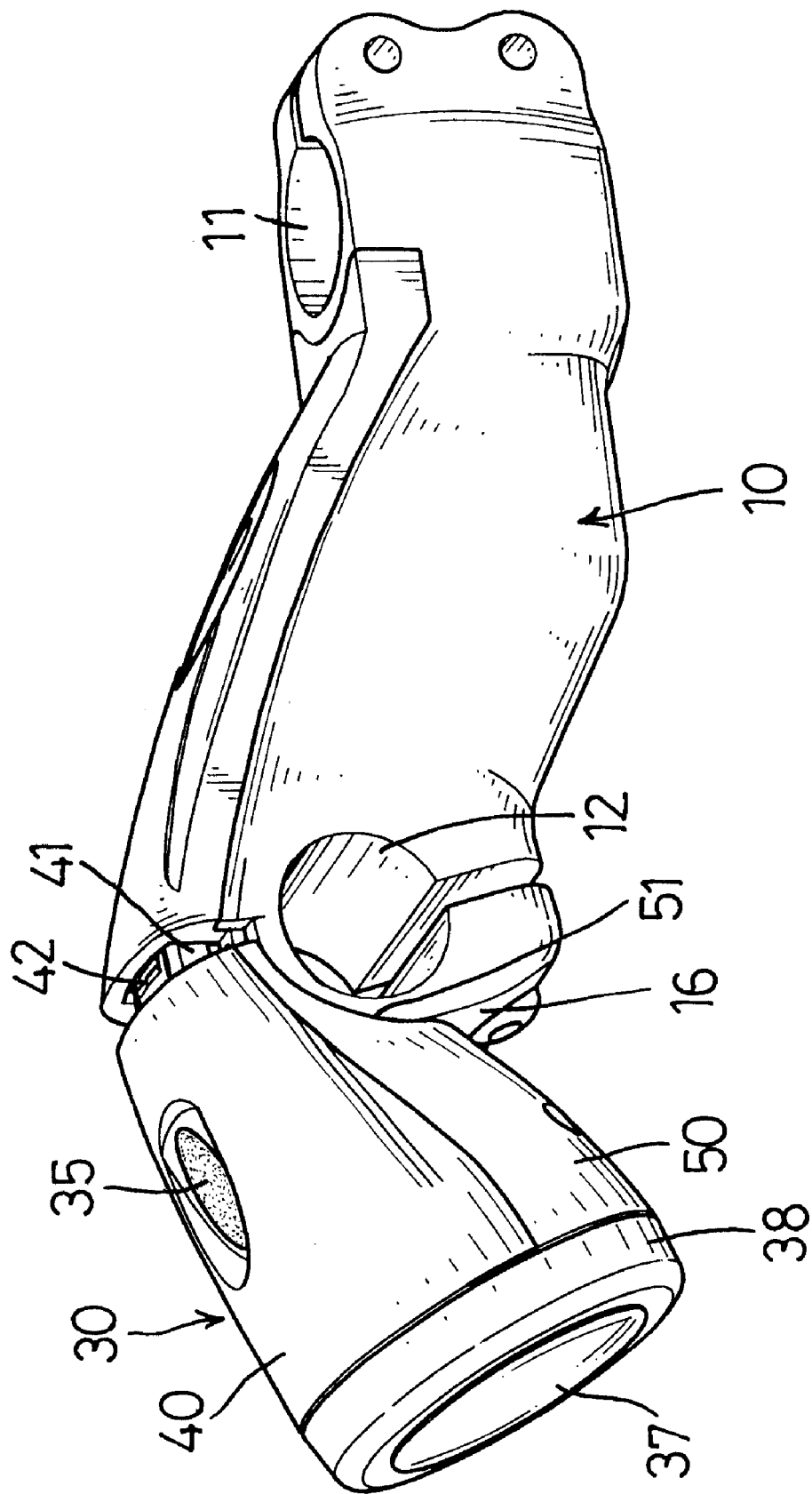
FIG. 1 is a perspective view of an adjustable front lamp for a bicycle in accordance with the invention.
Figure 2:
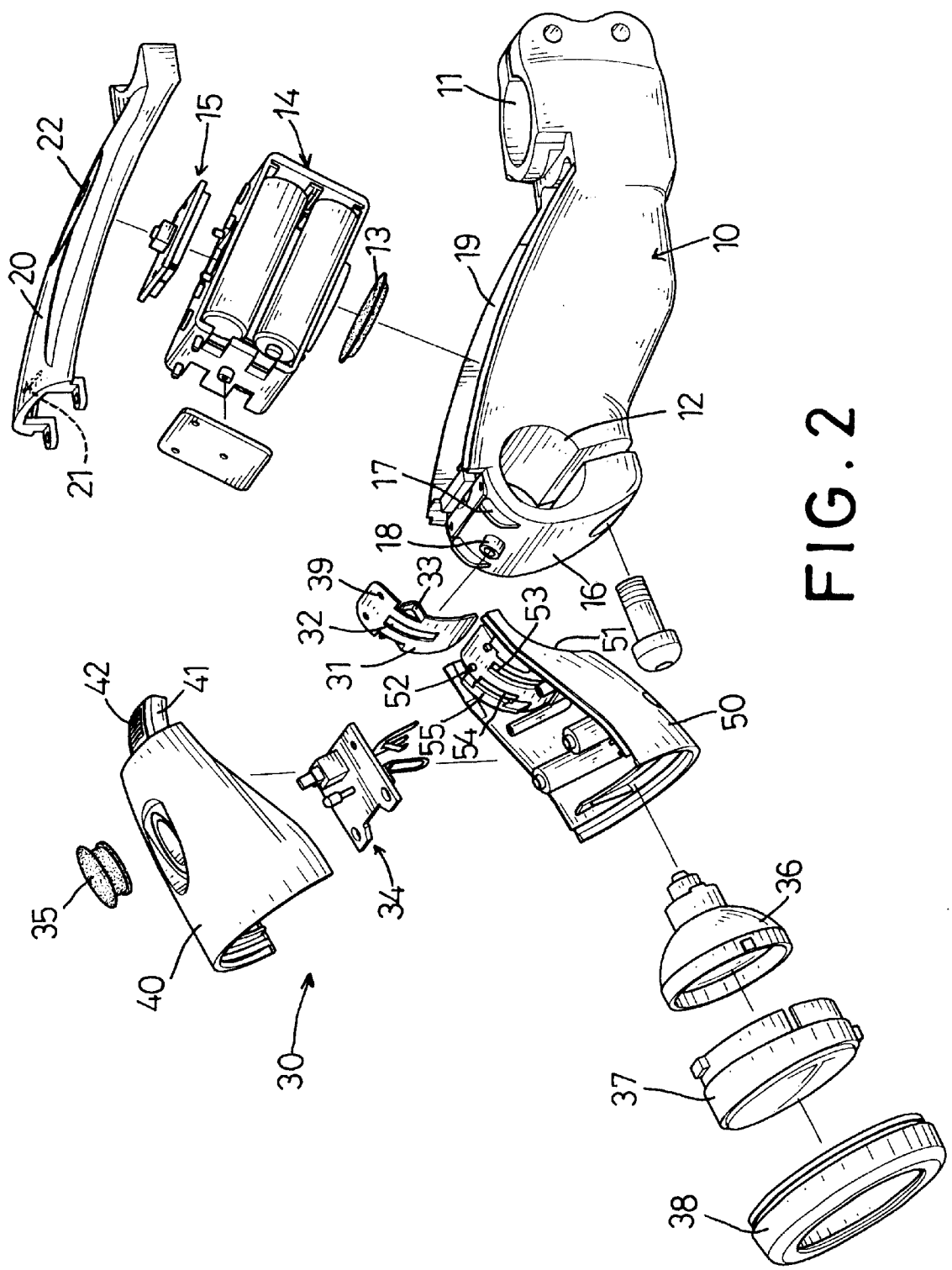
FIG. 2 is an exploded perspective view of the adjustable front lamp of FIG. 1.
Figure 3:
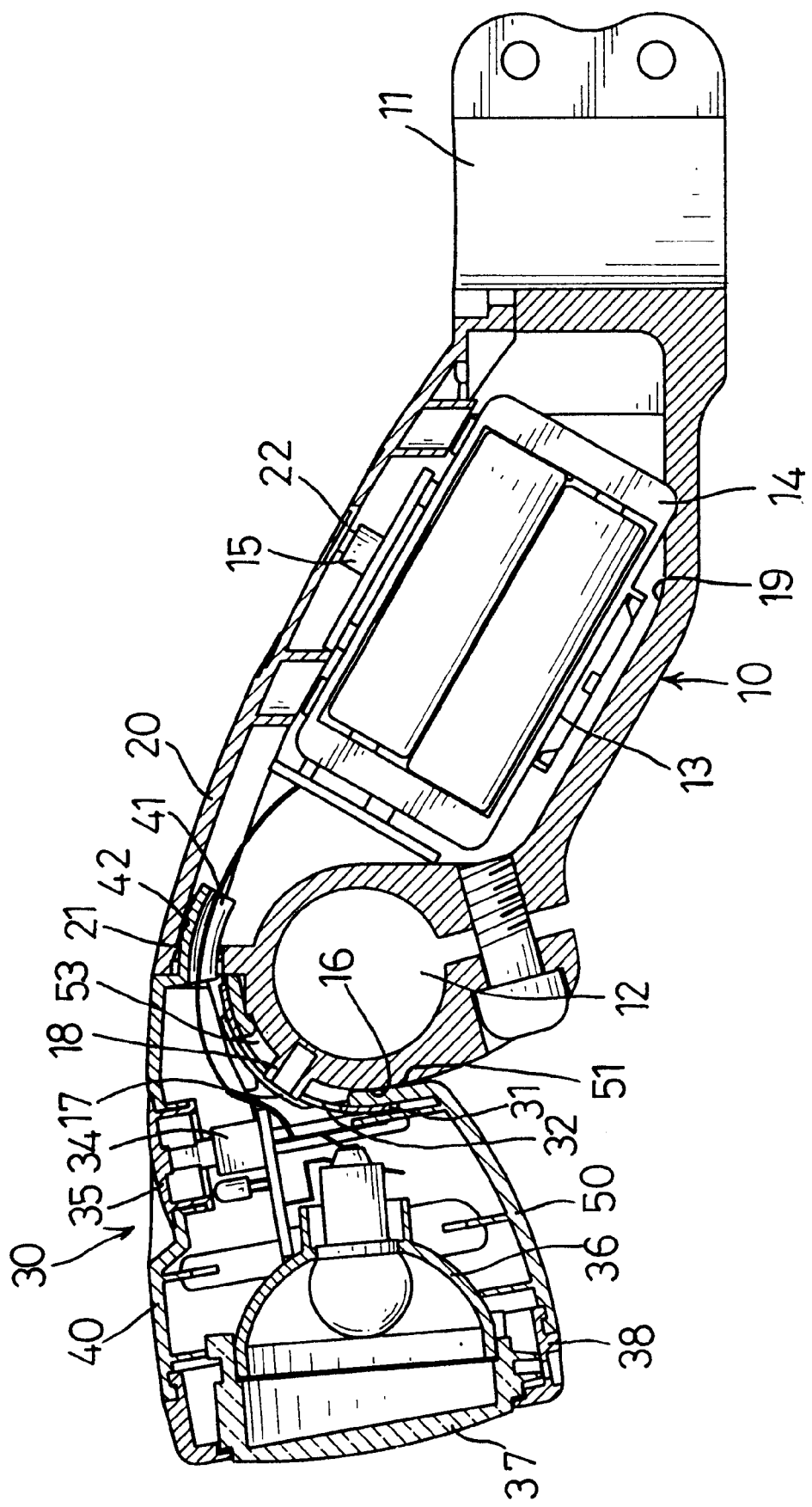
FIG. 3 is a sectional view of the adjustable front lamp of FIG. 1.

Referring to FIGS. 1–3, a front lamp for a bicycle in accordance with the present invention is composed of a stem (10) and a lamp seat (30).

The stem (10), which is assembled between a tube and a handlebar (not shown or numbered) of a bicycle, has an upright C-like hole (11) defined at a rear end thereof, and a lateral C-like hole (12) defined at a front end thereof. By use of screws (not shown or numbered), the tube and the handlebar are respectively extended through and fastened in the upright C-like hole (11) and the lateral C-like hole (12). A chamber (19) is defined in the stem (10) to receive a battery seat (14) therein. Batteries (not numbered) can be installed in the battery seat (14). A buzzer (13) is provided beneath and electrically connected with the battery seat (14). A buzzer switch (15) is provided on the battery seat (14) and extends out from the chamber (19).

A cover (20) is provided on the top of the chamber (19). A bar (21) is laterally formed on an inner face at a front end thereof. A buzzer button (22) is provided on the cover (20) and engaged with the buzzer switch (15).

A convex arcuate face (16) is formed at the front end of the stem (10). A protrusion (18) is formed at a central portion of the convex arcuate face (16), and a pair of fins (17) is formed at two sides of the protrusion (18) respectively.

Figure 5:
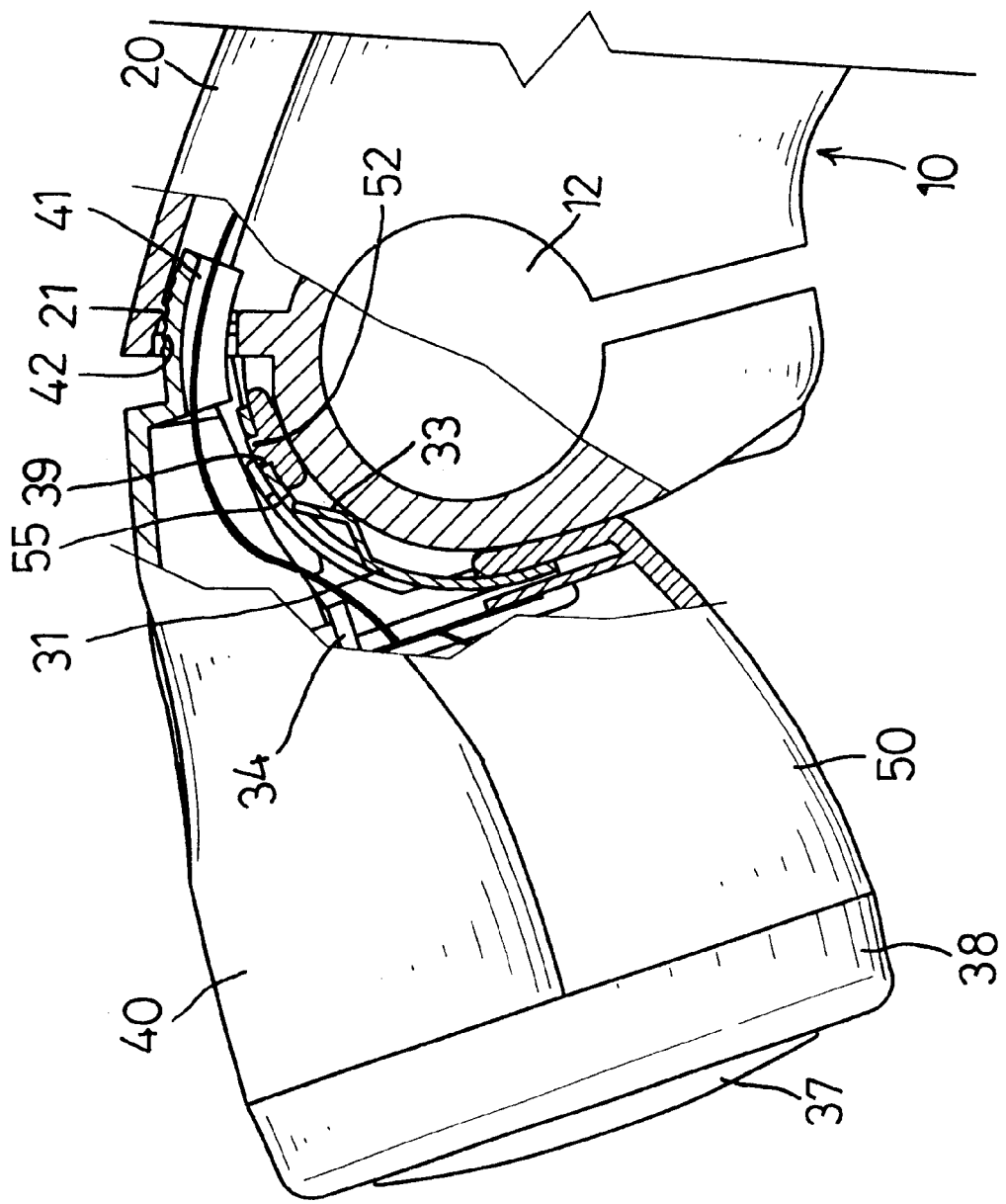
FIG. 5 is another partial sectional view of the adjustable front lamp.
Figure 6:
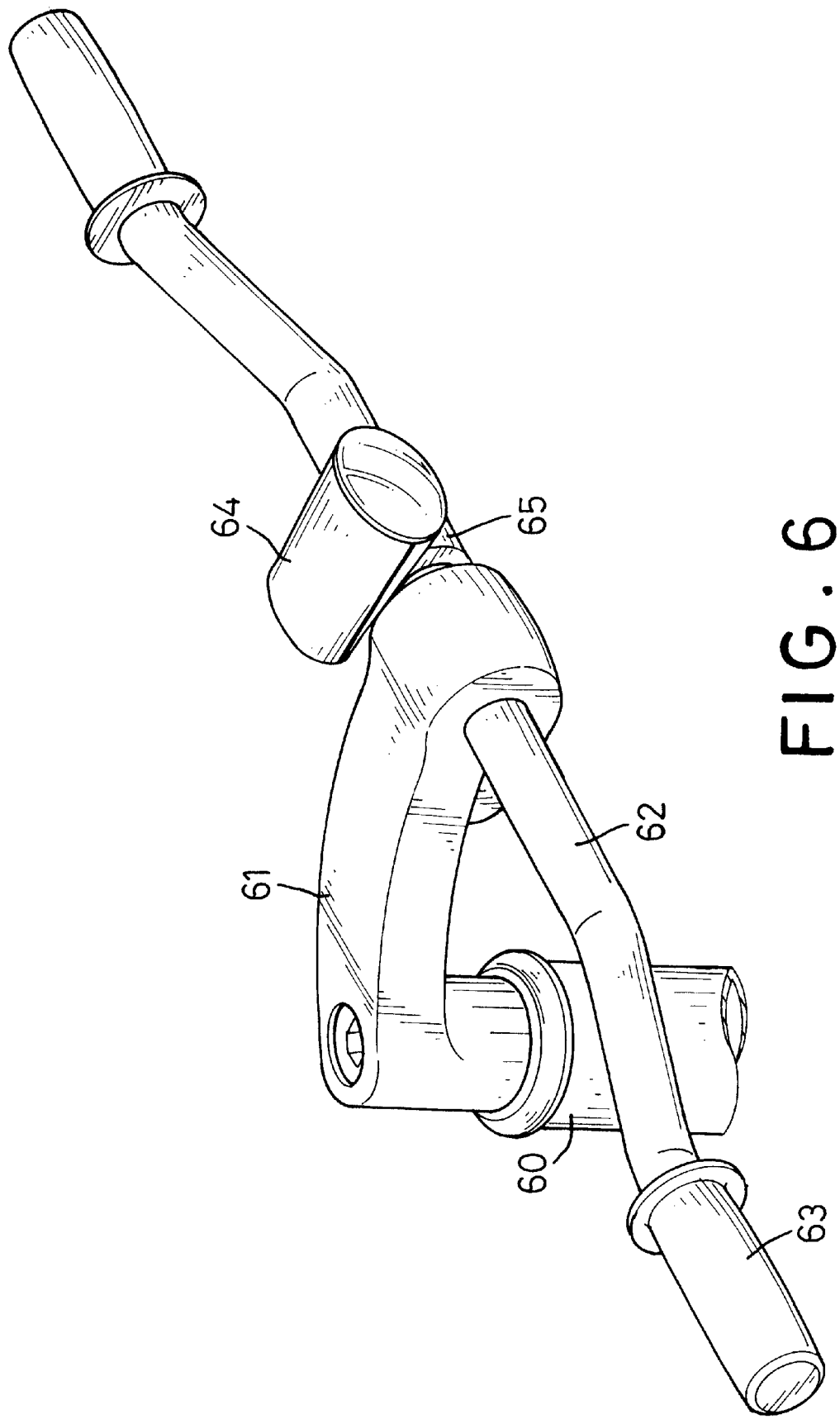
FIG. 6 is a perspective view of a conventional front lamp for a bicycle.

The lamp seat (30) being composed of an upper housing (40) and a lower housing (50), is assembled on the front end of the stem (10). The upper housing (40) has a tongue (41) formed at a rear end thereof and extending between the cover (20) and the stem (10). A plurality of teeth is (42) formed on the tongue (41), and the bar (21) is engaged with one of the teeth (42). The lower housing (50) has a concave arcuate face (51) to correspond to the convex arcuate face (16) of the stem (10). The fins (17) of the stem (10) are abutted to the concave arcuate face (51) and the protrusion (18) extends out from a first slot (53) longitudinally defined in the concave arcuate face (51), as shown in FIG. 5.

Two lugs (52) are formed at an upper end of the lower housing (50) and two second slots (54) are respectively defined on two sides of the first slot (53). Above the second slots (54), two ears (55) are respectively formed on two opposite side walls of the lower housing (50).

A flexible sheet (31) is received between the ears (55) and a bottom inner face of the lower housing (50), The flexible sheet (31) has a third slot (32) defined therein which is in alignment with the first slot (53) when the flexible sheet (31) is fitted to the lower housing (50). Two triangular protrusions (33) are respectively formed at two sides of the third slot (32) and extend out from the second slots (54). Two apertures (39) are defined therethrough for the lugs (52) of the lower housing (50) respectively extending thereout.

A lamp switch (34) is provided in the lamp seat (30) and electrically connected with the battery seat (14). A lamp button (35) is provided in the upper housing (40) and engaged with the lamp switch (34).

An illuminating member (36) is assembled at a front end of the lamp seat (30) and controlled by the lamp switch (34). A bezel (37) is assembled at a front end of the illuminating member (36) A ring (38) covering both the bezel (37) and the illuminating member (36) is engaged with the lamp seat (30) to fasten the bezel (37) and the illuminating member (36).

Figure 4:
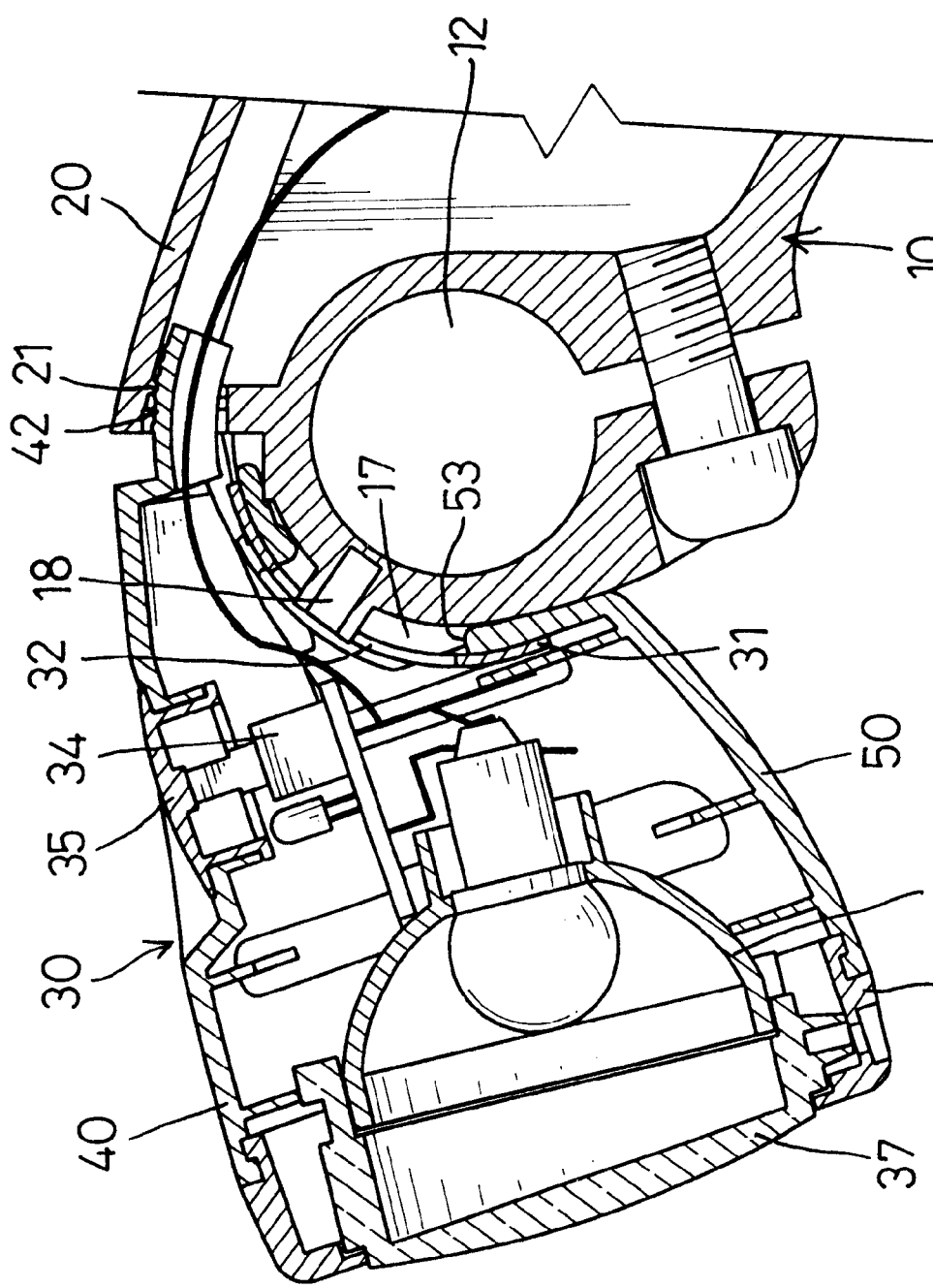
FIG. 4 is a partial sectional view of the adjustable front lamp of FIG. 1.

Referring to FIG. 4, a user can switch on the illuminating member (36) by pressing the lamp button (35), and can switch on the buzzer (13) by pressing the buzzer button. Moreover, in riding, the user can adjust an angle of the front lamp by pressing down or pulling up the lamp seat (30). When a user adjusts the angle of the lamp, the lamp seat (30) is moved along the convex arcuate face (16) of the stem (10), the protrusion (18) is moved along the first slot (53) and the third slot (32), and the fins (17) are moved along the concave arcuate face (51) of the lower housing (50). At the same time, the bar (21) is engaged with another one of the teeth (42) to position the lamp seat (30) at a desired angle.

From the above description, it is noted that the invention has the following advantages:

1. It is very convenient and safe for a user to adjust the front lamp while riding the bicycle.

2. The lamp seat is able to be held at the desired angle by the engagement between the bar and the teeth.

3. The front lamp has a dual-function in that it can be used as a light and a horn.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustable front lamp assembled between a tube and a handlebar of a bicycle, the lamp comprising:

a stem (10) having an upright C-like hole (11) defined at a rear end thereof, a lateral C-like hole (12) defined at a front end thereof, a protrusion (18) formed at the front end thereof, a chamber (19) defined therein, and a battery seat (14) received in the chamber (19);

a cover (20) provided on a top of the stem (10) and having a bar (21) laterally formed on an inner face of a front end thereof;

a lamp seat (30) movably assembled on the front end of the stem (10), and being composed of an upper housing (40) and a lower housing (50), and having a lamp switch (34) provided therein and electrically connected with the battery seat (14), wherein the upper housing (40) has a tongue (41) extending between the cover (20) and the stem (10), a plurality of teeth (42) formed on the tongue (41) and engaged with the bar (21) of the cover (20), and a lamp button (35) provided at a top face thereof and engaged with the lamp switch (34), the lower housing (50) has a first slot (53) longitudinally defined through a rear end thereof for the protrusion (18) extending thereout and being movable therealong; and an illuminating member (36) assembled in the lamp seat (30) and electrically connected with the lamp switch (34).

2. The front lamp as claimed in claim 1, wherein the stem (10) further has a convex arcuate face (16) formed at the front end thereof, and the lower housing (50) further has a concave arcuate face (51) formed at the rear end thereof to correspond to the convex arcuate face (16).

3. The front lamp as claimed in claim 2, wherein the stem (10) further has a pair of fins (17) respectively formed at two sides of the protrusion (18) and abutting the concave arcuate face (51) of the lower housing (50).

4. The front lamp as claimed in claim 1, wherein the lower housing (50) further has two second slots (54) respectively defined at two sides of the first slot (53), a flexible sheet (31) is provided in the lower housing (50) and has two triangular protrusions (33) formed at two sides thereof and extending out from the second slots (54) to abut the front end of the stem (10).

5. The front lamp as claimed in claim 4, wherein the lower housing (50) further has two ears (55) formed above the second slots (54) respectively, and the flexible sheet (31) is received between the ears (55) and a bottom surface of the lower housing (50).

6. The front lamp as claimed in claim 4, wherein the flexible sheet (31) further has a third slot (32) longitudinally defined therethrough and in alignment with the first slot (53).

7. The front lamp as claimed in claim 4, wherein the flexible sheet (31) further has two apertures (39) defined therethrough, and the lower housing (50) further has two lugs (52) respectively extending through the apertures (39).

8. The front lamp as claimed in claim 1 further has a bezel (37) provided in front of the illuminating member (36), and a ring (38) covering both the bezel (37) and the illuminating member (36) and engaged with the lamp seat (30) to fasten the illuminating member (36) and the bezel (37).

9. The front lamp as claimed in claim 1, wherein the stem (10) further has a buzzer (13) provided in the chamber (19) and electrically connected with the battery seat (14), and a buzzer switch (15) electrically connected with the battery seat (14) to control the buzzer (13).

10. The front lamp as claimed in claim 9, wherein the cover (20) further has a buzzer button (22) formed thereon and engaged with the buzzer switch (15).

* * * * *